(12) United States Patent
Quick et al.

(10) Patent No.: US 6,305,703 B1
(45) Date of Patent: Oct. 23, 2001

(54) BICYCLE TRAILER

(76) Inventors: Walter Ray Quick; Joan F. Quick, both of 1821 N. 10'th St., Canon City, CO (US) 81212

( * ) Notice: Subject to any disclaimer, the term of this patent is extended or adjusted under 35 U.S.C. 154(b) by 0 days.

(21) Appl. No.: 09/475,173

(22) Filed: Dec. 30, 1999

(51) Int. Cl.[7] .............................. B62K 27/00; B62B 1/12
(52) U.S. Cl. ......................... 280/204; 280/656; 280/42
(58) Field of Search ................................... 280/204, 656, 280/503, 649, 42

(56) References Cited

U.S. PATENT DOCUMENTS

| | | | |
|---|---|---|---|
| 3,347,559 | * 10/1967 | Robinson | 280/204 |
| 3,365,210 | * 1/1968 | Patterson | 280/644 |
| 3,567,249 | * 3/1971 | Robinson | 280/204 |
| 3,993,320 | * 11/1976 | Robinson | 280/204 |
| 4,721,320 | * 1/1988 | Creps et al. | 280/204 |
| 4,798,019 | * 1/1989 | Sury et al. | 43/1 |
| 5,070,687 | * 12/1991 | Schweigert | 56/202 |
| 5,242,178 | * 9/1993 | Galasso et al. | 280/204 |
| 5,516,131 | * 5/1996 | Novotny | 280/204 |
| 5,669,618 | * 9/1997 | Chiu | 280/204 |
| 5,687,980 | * 11/1997 | Eckroth | 280/204 |
| 5,785,334 | * 7/1998 | Robinson | 280/204 |
| 5,829,770 | * 11/1998 | Chiu | 280/204 |
| 5,829,771 | * 11/1998 | Hsu | 280/204 |
| 6,003,929 | * 12/1999 | Birdsell | 296/100.16 |
| 6,042,128 | * 3/2000 | Dinkins | 280/47.18 |
| 6,050,581 | * 4/2000 | Everett | 280/204 |
| 6,062,412 | * 5/2000 | Jacobsmeyer, Jr. | 220/254 |
| 6,099,008 | * 8/2000 | Caffey | 280/204 |

* cited by examiner

*Primary Examiner*—Robert P. Olszewski
*Assistant Examiner*—Andrew J. Fischer
(74) *Attorney, Agent, or Firm*—G. F. Gallinger

(57) ABSTRACT

An unusually light bicycle trailer which may be readily collapsed for shipping, transportation, and storage. The trailer employs a hitch which not only is unusually quickly attached or unattached from a bicycle, but additionally is so flexible that the bicycle can be laid down while remaining attached to a trailer standing in an upright position. The bicycle trailer comprises a trailer frame having two rectangular members, each rectangular member having opposite end portions which are centrally and pivotally attached to the opposite end portions of the other rectangular member; and each rectangular member having a lower side portion extending generally horizontally along one lower side portion of the trailer and an upper side portion extending generally horizontally along an upper side portion of the trailer; a strap extending between the rectangular members to maintain the members in spaced relationship; a tongue member; a releasable hitch; a trailer bottom portion extending between the lower side portions of the rectangular frame members; and, wheels each rotatingly mounted to an opposite central portion of the lower side portion of the trailer frame.

13 Claims, 1 Drawing Sheet

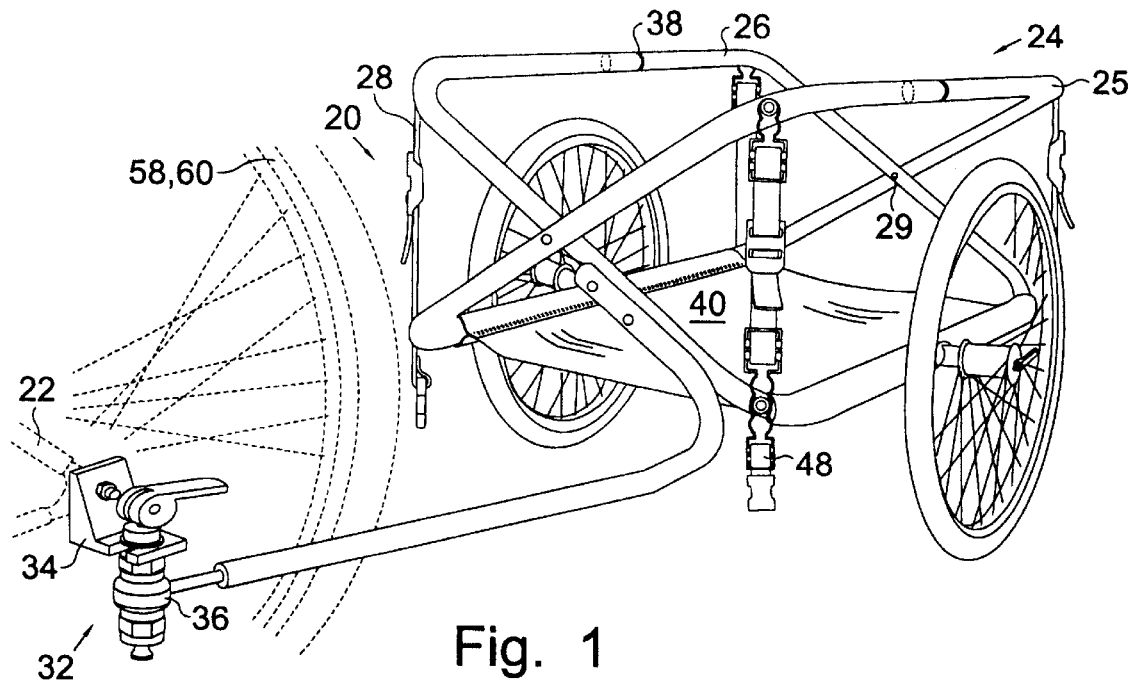
Fig. 1
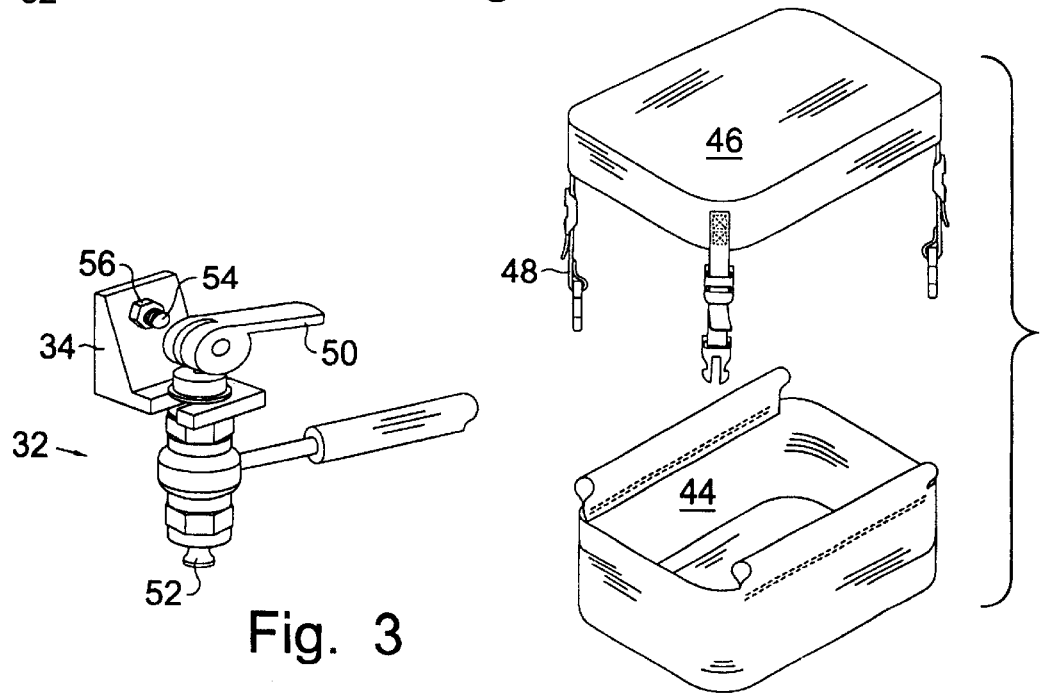
Fig. 3
Fig. 2

BICYCLE TRAILER

FIELD OF INVENTION

This invention relates to trailers adapted to be towed behind bicycles. More particularly this invention relates to a lightweight bicycle trailer which may be collapsed for storage, shipping and transportation in a vehicle.

BACKGROUND OF THE INVENTION

Avid cyclists enjoy participating in full day, overnight, and even cross country tours of several days duration. For these longer rides more gear is required. A small volume of gear may be carried behind a bicycle seat. More gear must be carried in a back pack. It is more convenient and less burdensome to carry this additional gear in a bicycle trailer.

Like a good bicycle, a good bicycle trailer should be adequately strong and as light as possible. It should also be easily attached to, and removed from a bicycle. It is desirable if the bicycle can be laid down while remaining attached to the trailer. Most of the time the trailer is not in use. If the trailer is collapsible for storage, shipping and transportation it is much more convenient to keep and use.

OBJECTS AND STATEMENT OF INVENTION

It is an object of this invention to disclose an unusually light bicycle trailer. It is yet a further object of this invention to disclose a trailer which may be readily collapsed for shipping and transportation, and a trailer which may be dissembled for ultimately convenient delivery and winter storage. It is yet a further object of this invention to disclose a trailer which may be quickly and easily attached to a bicycle. It is a final object of this invention to disclose a bicycle trailer hitch which not only is unusually quickly attached or unattached from a bicycle, but additionally is so flexibly that a bicycle can be laid down while remaining attached to a trailer standing in an upright position.

One aspect of this invention provides for a bicycle trailer for attachment to the frame of a bicycle comprising: a trailer frame having two rectangular members, each rectangular member having opposite end portions which are centrally and pivotally attached to the opposite end portions of the other rectangular member, and each rectangular member having a lower side portion extending generally horizontally along one lower side portion of the trailer and an upper side portion extending generally horizontally along an upper side portion of the trailer; spacing maintenance means extending between the two rectangular members; a tongue member having a rear end portion attached to a front end portion of the trailer frame; a central portion extending forwardly, and a front portion; a releasable hitch having a bicycle frame mounted portion which is carried by the bicycle frame, and a releasable portion which is attached to the front portion of the tongue member; a trailer bottom portion extending between the lower side portions of the rectangular frame members; and, wheels each rotatingly mounted to an opposite central portion of the lower side portion of the trailer frame.

Another aspect of this invention provides for a trailer as above wherein the trailer frame comprises tubing and wherein the upper and lower side members of the rectangular frame members of the trailer comprise breaks therethrough and wherein one end of the tubing adjacent to the break has a reduced diameter so that it may be inserted within the other end of the tubing adjacent to the break so that the rectangular frame members may be disassembled.

Various other objects, advantages and features of novelty which characterize this invention are pointed out with particularity in the claims which form part of this disclosure. For a better understanding of the invention, its operating advantages, and the specific objects attained by its users, reference should be made to the accompanying drawings and description, in which preferred embodiments of the invention are illustrated.

FIGURES OF THE INVENTION

The invention will be better understood and objects other than those set forth will become apparent to those skilled in the art when consideration is given to the following detailed description thereof. Such description makes reference to the annexed drawings wherein:

FIG. 1 is a perspective view of a bicycle trailer hitched to a bicycle.

FIG. 2 is a shrunken perspective view of a top cover and frame bag which may be positioned on and within the frame shown in FIG. 1.

FIG. 3 is an enlarged perspective view of the hitch shown in FIG. 1.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a bicycle trailer 20 hitched to a bicycle frame 22. The bicycle trailer 20 comprises: a trailer frame 24 having two rectangular members 26, each rectangular member 26 having opposite end portions which are centrally and pivotally attached 29 to the opposite end portions of the other rectangular member 26; and each rectangular member 26 having a lower side portion extending generally horizontally along one lower side portion of the trailer 20 and an upper side portion extending generally horizontally along an upper side portion of the trailer 20. Spacing maintenance means, which most preferably comprises a strap 28 extends between the two rectangular members 26. A tongue member 30 has a rear end portion attached to a front end portion of the trailer frame 24; a central portion extending forwardly, and a front portion. A releasable hitch 32 has a bicycle frame mounted portion 34 which is carried by the bicycle frame 22, and a releasable portion 36 which is attached to the front portion of the tongue member 30. A trailer bottom portion 40 extends between the lower side portions of the rectangular frame members 26. Two wheels are each rotatably mounted to opposite central portion of the lower side portion of the trailer frame 26.

Most preferably the trailer frame 24 comprises tubing 25. The upper and lower side portions of the rectangular frame members 26 of the trailer 20 comprise breaks 38 therethrough. One end of the tubing adjacent to the break has a reduced diameter so that it may be inserted within the other end of the tubing adjacent to the break 38 so that the rectangular frame members 26 may be joined and disassembled at the break.

Most preferably the trailer bottom portion 40 comprises fabric looped around the lower side portions of the rectangular frame members 26. similarly a frame bag 44 which is positioned within the frame 24 and seats on the trailer bottom portion 40 is made from fabric and has opposite top side portions which loop around the upper side portions of the rectangular members 26 of the trailer 20. In this application fabric is used in its broadest sense and is defined to include not only a canvas but additionally any fabricated synthetic sheet material whether woven or not.

Most preferably the trailer 20 further comprises a top cover 46 which is also made from fabric. The frame cover 46 has a substantial depth and has hold down straps 44 having sufficient length so that the top cover 42 may completely cover loads (not shown) extending above the upper side portions of the trailer 20. The hold down straps 48 which extend downwardly towards the lower side portions of the rectangular members 26 may utilize the type of plastic quick release buckles (not shown) utilised on back packs.

In the most preferred embodiment of the invention a releasable hitch 32 is employed which comprises the type of quick release lever 50 utilised on the wheels of bicycles The hitch 32 has an eccentric lever 50 which pulls on a shaft when the lever 50 is given a quarter turn. The bicycle frame mounted portion 34 of the releasable hitch 32 is adapted to be secured to the frame by an axle 54 and an axle nut 56 on the bicycle wheel 58. This type of hitch 32 may be configured so that the bicycle 60 can be laid down while attached to the trailer 20, while the trailer 20 remains in an upright position. No other bicycle trailer manufacturer employs a hitch which may be so quickly attached to a trailer. Additionally, no other manufacturer has a simple hitch which allows a user to lay their bicycle down on a tour without disconnecting the trailer from the bicycle. This is a considerable advantage because it eliminates the weight of a bicycle stand, and allows the bicycle to assume a more stable position in wind, on soft, or on rough terrain.

In this application bicycle is used in its broadest sense and intended to include a motorcycle.

While the invention has been described with preferred specific embodiments thereof, it will be understood that this description is intended to illustrate and not to limit the scope of the invention. The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be protected is defined by the following claims.

What is claimed is:

1. A bicycle trailer for attachment to the frame of a bicycle comprising:
 a trailer frame having two rectangular members, each rectangular member having opposite end portions which are centrally and pivotally attached to the opposite end portions of the other rectangular member; and each rectangular member having a lower side portion extending generally horizontally along one lower side portion of the trailer and an upper side portion extending generally horizontally along an upper side portion of the trailer;
 upright releasable spacing limitation means extending between the two rectangular members to restrain the frame from laterally compressing and heightening, said limitation means being releasable so that the trailer can be laterally collapsed merely by releasing the upright releasable spacing limitation means;
 a tongue member having a rear end portion attached to a front end portion of the trailer frame; a central portion extending forwardly, and a front portion;
 a releasable hitch having a bicycle mounted portion adapted to be carried by the bicycle, and a releasable portion which is attached to the front portion of the tongue member;
 a trailer bottom portion extending laterally between the lower side portions of the rectangular frame members to restrain the frame from laterally extending and flattening; and,
 wheels each rotatingly mounted to an opposite central portion of the lower side portion of the trailer frame.

2. A trailer as in claim 1 wherein the trailer frame comprises tubing.

3. A trailer as in claim 2 wherein the upper and lower side portions of the rectangular frame members of the trailer comprise breaks therethrough and wherein one end of the tubing adjacent to the break has a reduced diameter so that it may be inserted within the other end of the tubing adjacent to the break so that the rectangular frame members may be joined and disassembled at the break.

4. A trailer as in claim 3 wherein the trailer bottom portion comprises fabric looped around the lower side portions of the rectangular frame members.

5. A trailer as in claim 4 further comprising a frame bag which is positioned within the frame and seats on the trailer bottom portion.

6. A trailer as in claim 5 wherein the frame bag is made from fabric and has opposite top side portions which loop around the upper side portions of the rectangular members of the trailer.

7. A trailer as in claim 6 wherein the upright releasable spacing limitation means comprises a strap extending between a lower and upper side portion of the trailer.

8. A trailer as in claim 6 further comprising a top cover which is made from fabric.

9. A trailer as in claim 8 wherein the frame cover has hold down straps which extend downwardly towards the lower side portions of the rectangular members.

10. A trailer as in claim 9 wherein the frame cover has a substantial depth and the hold down straps have sufficient length so that the top cover may completely cover loads extending above the upper side portions of the trailer.

11. A trailer as in claim 2 wherein releasable hitch comprises an eccentric lever which pulls on a shaft when the lever is given a quarter turn and wherein the eccentric lever is used to quickly detach the trailer from the bicycle mounted portion thereof.

12. A trailer as in claim 11 wherein the bicycle mounted portion of the releasable hitch is adapted to be secured to the bicycle by an axle and an axle nut on the bicycle wheel so that the bicycle mounted portion can be secured without marring the paint on any bicycle having any frame shape and so that the trailer cannot change the alignment of the bicycle wheel.

13. A trailer as in claim 12 wherein the hitch is configured so that the bicycle can be laid down while attached to the trailer and while the trailer remains in an upright position.

* * * * *